United States Patent
Sridharan et al.

(10) Patent No.: US 7,339,780 B2
(45) Date of Patent: *Mar. 4, 2008

(54) COPPER TERMINATION INKS CONTAINING LEAD FREE AND CADMIUM FREE GLASSES FOR CAPACITORS

(75) Inventors: Srinivasan Sridharan, Strongsville, OH (US); Umesh Kumar, Carlsbad, CA (US)

(73) Assignee: Ferro Corporation, Cleveland, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 11/201,278

(22) Filed: Aug. 10, 2005

(65) Prior Publication Data

US 2006/0028788 A1   Feb. 9, 2006

Related U.S. Application Data

(63) Continuation-in-part of application No. 10/864,309, filed on Jun. 9, 2004, now Pat. No. 6,982,864.

(51) Int. Cl.
*H01G 4/228* (2006.01)

(52) U.S. Cl. .................... 361/306.1; 361/306.3; 361/321.1; 361/321.2; 361/321.4; 361/311; 361/313; 501/16; 501/19; 252/62.2

(58) Field of Classification Search ........ 361/321.1, 361/321, 2, 311–313, 302–305, 306.1, 306.3, 361/3; 252/62.2; 501/16, 19
See application file for complete search history.

(56) References Cited

U.S. PATENT DOCUMENTS

| | | | |
|---|---|---|---|
| 3,615,772 A | 10/1971 | Kohut | |
| 4,152,282 A | 5/1979 | Baudry et al. | |
| 4,220,547 A | 9/1980 | Abe et al. | |
| 4,323,652 A | 4/1982 | Baudry et al. | |
| 4,379,319 A | 4/1983 | Wilson | |
| 4,517,155 A | 5/1985 | Prakash et al. | |
| 4,880,567 A | 11/1989 | Prabhu et al. | |
| 4,906,406 A | 3/1990 | Hormadaly | |
| 5,051,381 A | 9/1991 | Ohji et al. | |
| 5,165,986 A | 11/1992 | Gardner et al. | |
| 5,296,426 A | 3/1994 | Burn | |
| 5,439,852 A | 8/1995 | Hormadaly | |
| 5,468,695 A | 11/1995 | Carroll et al. | |
| 5,491,118 A | 2/1996 | Hormadaly | |
| 5,753,571 A | 5/1998 | Donohue | |
| 5,805,409 A * | 9/1998 | Takahara et al. | 361/303 |
| 5,948,536 A | 9/1999 | Suzuki et al. | |
| 6,105,394 A | 8/2000 | Sridharan et al. | |
| 6,124,224 A | 9/2000 | Sridharan et al. | |
| 6,171,987 B1 | 1/2001 | Hormadaly | |
| 6,185,087 B1 * | 2/2001 | Park et al. | 361/321.4 |
| 6,556,422 B2 * | 4/2003 | Kim et al. | 361/321.2 |
| 6,572,793 B2 * | 6/2003 | Fukui et al. | 252/520.2 |
| 6,649,554 B1 * | 11/2003 | Chang et al. | 501/137 |
| 6,673,274 B2 | 1/2004 | Venigalla et al. | |
| 6,982,864 B1 * | 1/2006 | Sridharan et al. | 361/321.1 |

\* cited by examiner

*Primary Examiner*—Nguyen T. Ha
(74) *Attorney, Agent, or Firm*—Rankin, Hill, Porter & Clark LLP

(57) ABSTRACT

A reduction resistant lead-free and cadmium-free glass composition that is particularly suitable for use in conductive ink applications is disclosed. The invention includes a capacitor, which includes a conductive copper termination. The copper termination is made by firing an ink including a glass component, which may include ZnO, provided the amount does not exceed about 65 mole %; $B_2O_3$, provided the amount does not exceed about 61 mole %; and, $SiO_2$, provided the amount does not exceed about 63 mole %. The molar ratio of $B_2O_3$ to $SiO_2$ is from about 0.05 to about 3.

20 Claims, 1 Drawing Sheet

COPPER TERMINATION INKS CONTAINING LEAD FREE AND CADMIUM FREE GLASSES FOR CAPACITORS

This application is a continuation-in-part of commonly owned copending U.S. Ser. No 10/864,309, entitled "COPPER TERMINATION INKS CONTAINING LEAD FREE AND CADMIUM FREE GLASSES FOR CAPACITORS," filed Jun. 9, 2004, now U.S. Pat. No. 6,982,864.

FIELD OF THE INVENTION

The present invention relates to lead-free and cadmium-free copper termination inks containing reduction resistant lead-free and cadmium-free glasses for use in producing electronic capacitors.

BACKGROUND OF THE INVENTION

Capacitors are electrical components that have the capability of storing electrical energy. This energy is stored in an electrostatic field that is created by electrical charges accumulating on conducting plates placed across an electrical potential and separated by an insulating medium such as ceramics, for example barium titanate ($BaTiO_3$), magnesium titanate ($MgTiO_3$). These ceramic capacitors are used in various applications such as in temperature compensation, in semiconductors, and in applications requiring various dielectric constants, for example Low K class I ceramics and Higher K class II ceramics.

A conventional structure for ceramic capacitors is a structure of multiple layers in which dielectric layers of ceramic are interleaved with conductive electrodes. Alternating conductive electrodes are electrically connected, resulting in a device having two effective electrodes with a capacitance many times the capacitance of the single dielectric layer, packed in a relatively very small volume. These multilayer ceramic capacitors (MLCCs) are the most reliable component for high energy density storage banks. This type of capacitor has been developed to meet demands for high-density ceramic capacitors.

MLCCs consist of a plurality of interleaved and staggered layers of an electrically conductive film of metal known as electrodes, formed by the deposition (usually by screen printing or the like) of a thick film paste or ink, and electrically insulating layers of a dielectric ceramic oxide, formed by laying a cast dielectric tape or by casting a dielectric slurry over the dried electrode. Such capacitors are well known in the art. U.S. Pat. No. 2,389,420, for example, describes the structure, manufacture and properties of monolithic multilayer ceramic capacitors formed using cast dielectric green (unfired) tape.

In a typical MLCC the end termination provides the vital electrical path between the inner electrodes and components exterior to the capacitor. A typical end termination is made by post firing an end termination ink on a pre fired MLCC structure. A typical end termination ink comprises metal particles and glass particles dispersed in an organic medium. Despite its relatively small proportion in an end termination ink, glass plays a major role in providing adhesion to the capacitor body, providing thermal expansion matching between metal and the capacitor body to avoid cracking at the interface, ensuring good metal densification, allowing a wider firing window, and preventing penetration of plating solution into the termination during subsequent processing.

Multi-layered ceramic capacitors incorporate multiple printed layers of electrode plates made of thin ceramic sheets, (e.g., thickness 10 to 20 µm). These capacitors are more compact and have better temperature characteristics than single-layered ceramic capacitors. Air fired conventional multi-layered ceramic capacitors are, however, expensive because their electrode plates use precious metals, such as silver, gold, platinum, palladium and alloys thereof. Therefore MLCCs with base metal electrodes have been developed. However these have to be fired in atmospheres containing very little $O_2$, such as $N_2$ atmosphere with less than 10 ppm oxygen. Development of novel reduction resistant end termination inks in general, and reduction resistant Pb free and Cd free glasses for use in termination ink in particular, is the subject of this present invention.

SUMMARY OF THE INVENTION

The present invention provides a lead-free and cadmium-free copper containing termination ink for use in producing a multilayer capacitor. The ink includes a glass component. The glass component contains at least one glass frit. At least one of the glass frits is partially crystallizing to maintain a high viscosity to prevent a defect called glassing which will interfere with proper solder wetting and adhesion. In general, the present invention comprises a termination ink having a metal component and a glass component. The metal component comprises copper. The glass component comprises ZnO, provided the amount does not exceed about 65 mole %, $B_2O_3$, provided the amount does not exceed about 61 mole %, and $SiO_2$, provided the amount does not exceed about 63 mole %. The molar ratio of $B_2O_3$ to $SiO_2$ is from about 0.05 to about 3

New conductive materials, including termination inks, are continually being sought in the MLCC industry that provide improved adhesion to substrates, improved chemical resistance to plating solutions, a wider processing window, and better metal sintering. The termination inks of the present invention provide such desired characteristics. The invention further provides a novel capacitor made using the inventive termination ink and a method of fusing such end termination inks.

The copper termination inks of the present invention upon firing exhibit superior adhesion to $BaTiO_3$ and display good compatibility with base metal electrodes. The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
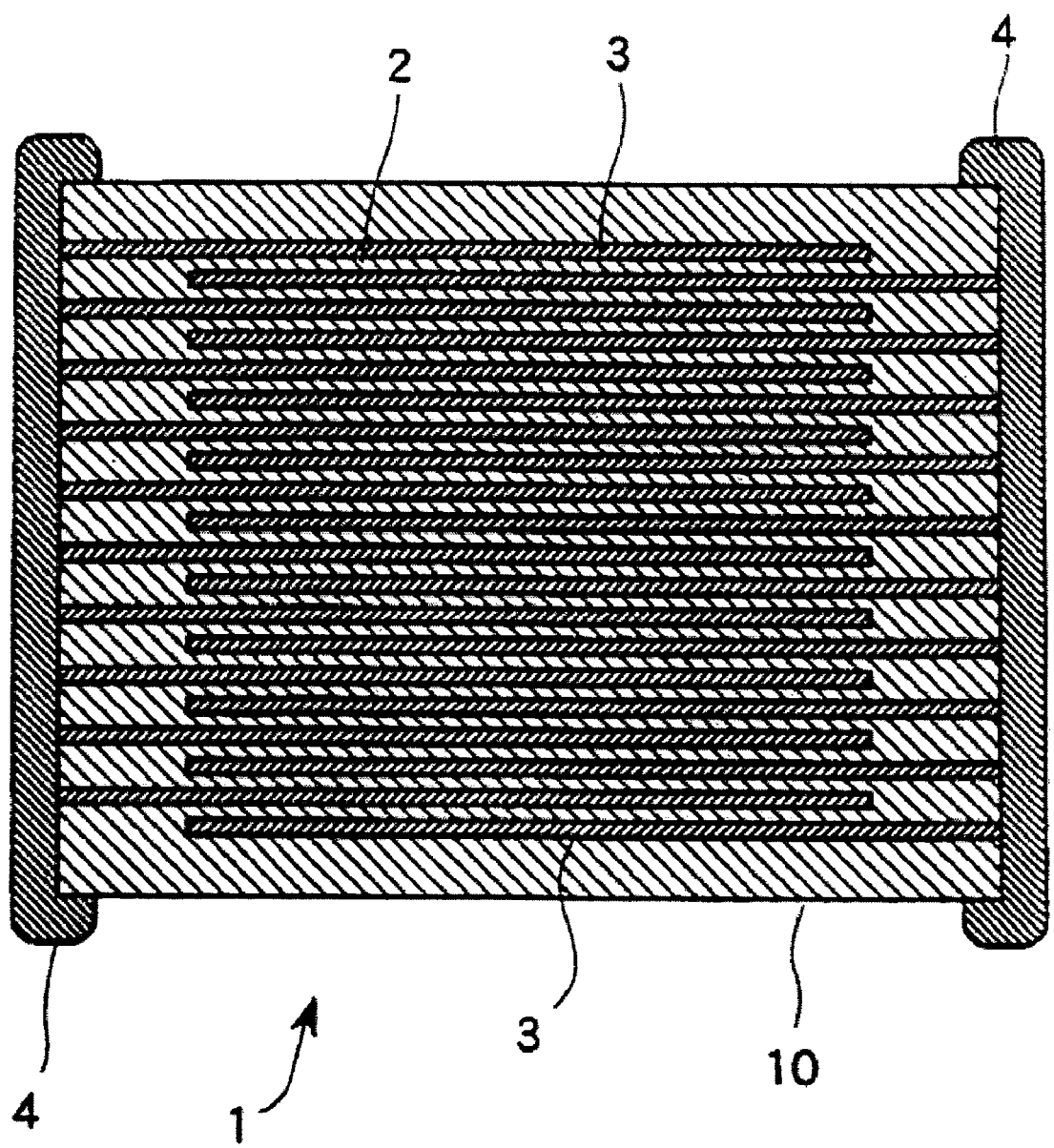
FIG. 1 is an elevational cross-sectional view of a multilayer ceramic chip capacitor according to the invention.

The present invention provides a termination ink comprising a metal component, a glass component and a binder component. The invention further provides a capacitor made using the termination ink disclosed herein.

In the description and accompanying claims, all compositional percentages relating to the glass component are in mole %, and ratios are molar ratios. Conversely, all compositional percentages relating to the composition of the termination ink are in weight percent (wt %). A statement that a composition contains, for example, "about 15 to about 35 mole % BaO+CaO" means that with respect only to the BaO and CaO in the composition, the combined total of BaO and CaO is about 15 to about 35 mole % of the total composition on a molar basis. All values of weight, moles and temperatures are presumed to be preceded by the word "about." Viscosities are measured at room temperature which is about 22° C.

The glass component of the present invention is lead-free and cadmium-free. As used throughout the instant specification and the appended claims, the phrases "lead-free" and "cadmium-free" mean that no lead, PbO, or lead-containing glasses, cadmium, CdO, or cadmium containing glasses have been intentionally added to the composition. While trace amounts of elements including Pb and Cd could be present from contaminants of raw materials, with respect to the overall inorganic portion of the ink, the content of Pb will be less than 200 ppm and similarly, the Cd content will be less than 200 ppm. The glass frit or frits of the present invention may include ZnO, $SiO_2$, $B_2O_3$, $Al_2O_3$, BaO, CaO, MgO, CuO, $SnO_2$, $CeO_2$ as well as alkali oxides such as $Li_2O$, $Na_2O$, $K_2O$, $Rb_2O$, $Cs_2O$ and $Fr_2O$. It is possible and sometimes desirable to practice the invention wherein the glass component excludes alkali oxides as well as SrO. Accordingly, certain preferred embodiments intentionally exclude alkali oxides or SrO or both.

It will be appreciated that the glass component according to the invention can comprise one glass frit, or it can comprise a mixture of several glass frits, including non-crystallizing glass frits, or a mixture of glass frits and inorganic oxides such as $SiO_2$, ZnO, $B_2O_3$, and others, so as to provide the desired glass composition. The glass frit or frits of the glass component may be prepared utilizing conventional glass melting techniques. A conventional ceramic refractory, fused silica, or platinum crucible may be used to prepare the glass frit. Typically, a mixture of selected raw materials designed to give the desired glass composition are smelted at temperatures of from about 1000° C. to about 1550° C. for about 60 minutes. The molten glass formed in the crucible is then converted to glass flakes or cullets using water-cooled steel rollers or quenching in a tank of water. Pouring onto cold steel rolls results in thin flakes suitable for milling. These flakes or cullets are then milled to a suitable particle size distribution (e.g., average particle size of about 2 to about 6 microns). It will be appreciated that a coarser particle size of 40-50 microns can be used in dip coating and spraying applications. It will be further appreciated that the production the glass frit is not per se critical and any of the various techniques well known to those skilled in the art can be employed.

In general the termination inks are applied and fired on a prefired MLCC pieces (i.e., used on a post fired basis). Typical firing temperatures of the inventive inks and glasses are from about 750° C. to about 900° C., preferably from about 780° C. to about 880° C., and more preferably from about 810° C. to about 850° C.

The metal component comprises copper metal. Copper metal typically is provided in the form of at least one powder or flake. Copper powders may have particle sizes ranging from about 0.1 micron to about 40 microns. In particular, more than one size range of copper particles may be used. For example, a first, finer, copper powder may have a size distribution of d10=0.1-0.3 microns, $D_{50}$=0.6-1.1 microns and d90=1.5-3.5 microns. A second, coarser, copper powder may have a size distribution range of d10=2-5 microns; $D_{50}$=3-8 microns; and d90=10-15 microns. An intermediate size copper powder may have a size distribution of d10=1.5-2.5 micron, $D_{50}$=2.5-3.5 micron, d90=5-9 microns. Commercially available copper powders suitable herein include Cu 10K-1, Cu8ED, and P300 from the Ferro Corporation of Cleveland, Ohio, and Cu 1050Y and Cu MA-CF-E from the Mitsui Mining and Smelting Co, Ltd, of Tokyo, Japan.

The organic binder is usually an organic resin mixed with a suitable vehicle. The vehicle generally includes one or more solvents. The vehicle preferably comprises a solvent and a resin. Optionally, the vehicle may also comprise a thixotrope and a wetting agent in order to facilitate the application of the ink to the capacitor. Any essentially inert binder can be used in the practice of the present invention, including various organic liquids, with or without thickening and/or stabilizing agents and/or other common additives. Exemplary of the organic liquids which can be used are the aliphatic alcohols, esters of such alcohols, for example, the acetates and propionates. Terpenes also may be used, such as pine oil, alpha terpineol, and beta terpineol. Suitable terpenes include those available from Hercules Corporation of Wilmington, Del., under the Terpineol® trademark, including for example Terpineol® Prime 318, which is a mixture of isomeric terpineols obtained by dehydration of terpene hydrate and contains about 60 to 65 wt. % of alpha-terpineol and 15 to 20% beta-terpineol, and 18 to 20% of other tertiary terpene alcohols Also suitable are solutions of acrylic resins such as the polymethacrylates of lower alcohols, or solutions of ethyl cellulose in solvents such as pine oil, the monobutyl either of ethylene glycol monoacetate, and carbinol kerosene, dibutyl phthalate, hexylene glycol, 2,4,4-trimethyl-1, 3-pentanediol monoisobutyrate, N-methyl-2-pyrrolidone, ethyl hydroxyethyl cellulose, wood rosin, mixtures of ethyl cellulose and phenolic resins, and the monobutyl ether of ethylene glycol monoacetate or mixtures thereof. Additionally, solvents sold under the Dowanol® or Carbitol® trademarks, commercially available from the Dow Chemical Company, Midland Mich., may be used. Such Dowanol® solvents suitable in the practice of the present invention include propylene glycol, methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, and the like. Suitable solvents sold under the Carbitol® trademark include butyl carbitol (diethylene glycol monobutyl ether), butyl carbitol acetate (diethylene glycol monobutyl ether acetate) and the like. Various combinations of these and other solvents may be formulated to obtain the desired viscosity and volatility requirements for each application.

Examples of potential suitable thixotropic agents include organic based thixotropes such as, for example, ethyl cellulose, hydrogenated castor oil, silicates and derivatives thereof.

Examples of potential suitable wetting agents (i.e., surfactants) include fatty acid esters, for example, N-tallow-1, 3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

The glass compositions of the present invention provide superior adhesion to common capacitor substrates, including $BaTiO_3$, $Nd_2Ti_2O_7$, $MgTiO_3$ and others, as well as good copper densification. Further, they allow a wider firing window with no blistering or glassing effect. It is believed that the presence of ZnO promotes adhesion of the termination ink to $BaTiO_3$ substrates due to the formation of zinc titanates at the interface.

The molar ratio of $B_2O_3$ to $SiO_2$ is believed to play a role in effecting copper densification of different size powders. The inventors herein have found that the molar ratio of $B_2O_3$ to $SiO_2$ in the glass compositions has an effect on copper densification. A ratio over 0.7 and preferably over 1.0 provides adequate copper densification for finer copper powders. However, lower molar ratios of $B_2O_3$ to $SiO_2$ provide adequate or superior copper densification for relatively coarser copper powders. Such lower molar ratios of $B_2O_3$ to $SiO_2$ may be from about 0.05 to about 3, preferably about 0.1 to about 2, more preferably about 0.2 to about 1, and still more preferably about 0.2 to about 0.8.

Desirable properties of a termination include a wide processing window (firing temperatures), good adhesion to $BaTiO_3$ (and other typical dielectric components), good chemical resistance to plating solutions, good solder wetting, as well as good copper densification. As is known in the art, a termination is sometimes known as an external electrode.

A method of providing good adhesion at the interface includes reactive bonding. In reactive bonding fluid glass spreads on and reacts with a $BaTiO_3$ substrate, forming thermodynamically stable crystals at the interface. These crystals can be, for example, titanates, silicates, or aluminates. Reactions between the substrate and the crystals to form such beneficial reactive phases are believed to lead to an overall decrease of the total free energy of the system, which can lead to increased adhesion. Of course, mechanical interlocking between termination glass and substrate may also be involved.

In addition to the glass component, the metal component, and the binder, various conventional fillers or expansion modifiers may be included in the ink. Examples of such fillers or expansion modifiers include zinc silicates, magnesium silicates, barium silicates, calcium silicates, barium aluminum silicates, zirconium silicates, barium magnesium silicates, zirconia, alumina, silica, titania and mixtures of the foregoing.

In order to produce a termination ink, the copper powder (one or more) and the glass component (one or more glass frits and/or crystalline additives), together with a binder, solvent, and wetting agent, are batched and homogenized in a mixer. In general, a Hobart mixer is used. After homogenization, the ink is milled in a 3-roll mill. After multiple passes, the homogeneity of the ink will be tested by a fineness of grind measurement.

A first embodiment of the present invention is an ink including a glass component, the glass component comprising ZnO, provided the amount does not exceed about 65 mole %; $B_2O_3$, provided the amount does not exceed about 61 mole %; and, $SiO_2$, provided the amount does not exceed about 63 mole %; wherein the ratio of $B_2O_3$ to $SiO_2$ is from about 0.1 to about 3. This embodiment comprises a measurable amount of ZnO, $B_2O_3$ and $SiO_2$. Further embodiments of the invention are set forth in Table 1, with additional oxide ingredients presented in Tables 2 and 3.

TABLE 1

Principal Oxide ingredients of Ink Glasses (Embodiments A-F)

| | Embodiment | | | | | |
|---|---|---|---|---|---|---|
| Oxide | A | B | C | D | E | F |
| | mole percent | | | | | |
| ZnO | no greater than 65 | 10-60 | 25-55 | 20-30 | 15-25 | none |
| $B_2O_3$ | no greater than 61 | 1-40 | 15-25 | 15-25 | 15-20 | 1-35 |
| $SiO_2$ | no greater than 63 | 1-55 | 10-30 | 35-50 | 33-49 | 1-55 |

TABLE 2

Supplementary oxide ingredients.

| Oxide | mole percent | | | |
|---|---|---|---|---|
| $Al_2O_3$ | no greater than 17 | 0.1-17 | 1-7 | 0.1-5 |
| BaO + CaO | no greater than 40 | 0.1-30 | 5-15 | 0.1-35 |
| Alkali oxides | 2-25 | | 5-18 | 5-15 | 1-13 |

TABLE 3

Additional glass frit ingredients

| $TiO_2 + ZrO_2$ | MgO | $P_2O_5$ | $In_2O_3$ | SnO | CuO | NiO | MnO | F |
|---|---|---|---|---|---|---|---|---|
| 0.1-15 | 0.1-20 | 0.1-10 | 0.1-10 | 0.1-10 | 0.1-20 | 0.1-20 | 0.1-20 | 1-20 |
| 1-10 | 5-15 | 1-7 | 1-7 | 1-7 | 1-10 | 1-10 | 1-10 | 5-15 |
| 1-5 | 1-10 | 1-5 | 1-5 | 1-5 | 1-5 | 1-5 | 1-5 | 7-13 |

In Table 1, the columns A, B, C, D, etc. represent various embodiments of the invention. For example, one embodiment (C) comprises 25-55 mol % ZnO, 15-25 mol % $B_2O_3$ and 10-30 mol % $SiO_2$. Conversely, Tables 2 and 3 depict various ranges of oxide and frit ingredients, which, in certain embodiments, can be combined with formulations in any of columns A-F of Table 1. For example, an embodiment of the present invention comprises 15-25 mol % ZnO, 15-20 mol % $B_2O_3$, 33-49 mol % $SiO_2$, 0.1-5 mol % $Al_2O_3$, 5-15 mol % alkali oxides ($Li_2O+Na_2O+K_2O+Rb_2O+Cs_2O+Fr_2O$), 5-15 mol % $TiO_2+ZrO_2$ and 1-20 mol % F. By "no greater than" is meant that some measurable amount of the given ingredient is present up to the indicated value. This phrase corresponds to the phrase "provided the amount does not exceed," in the claims.

Another embodiment of the invention is a lead-free and cadmium-free ink for forming a conductive copper pathway, said ink comprising a metal component and a glass component, said glass component comprising ZnO, provided the amount does not exceed about 65 mole %; $B_2O_3$, provided the amount does not exceed about 61 mole %; $SiO_2$, provided the amount does not exceed about 63 mole %. Preferably, the molar ratio of $B_2O_3$ to $SiO_2$ is from about 0.05 to about 3. Preferably, the ink comprises about 1 to about 22 wt % of the glass component, more preferably about 5 wt % to about 9 wt %.

The termination ink in a green, unfired state, may have viscosity of about 15,000 to 35,000 centipoise when measured using Brookfield HAT type SC4 14/5R viscometer and spindle assembly. Preferably this viscosity is about 20,000 to about 30,000 centipoise, and more preferably about 22,000 centipoise to about 28,000 centipoise when measured at room temperature, ca. 22° C.

Where two glasses compositions are used, the primary glass is used for adhesion without glassing, and the second glass is used to improve the durability and/or thermal expansion matching of the glass component, and such second glass preferably has a low content of zinc, or more preferably no zinc at all. An ink composition of the present invention includes one or more copper powders, at least one glass frit, a binder, organic additives and a solvent. The ink comprises about 55-85 wt % of copper powder, about 1-22 wt % of one or more glass frits, about 1-10 wt % of a binder, about 0.1-3 wt % of additives and about 5-25 wt % of a solvent. Preferably, the ink comprises about 70-80 wt % of the one or more copper powders, about 2-15 wt % of one or more glass frits, about 2-6 wt % of a binder, about 0.5-2 wt % of additives, and about 5-20 wt % of a solvent.

A further embodiment of the present invention is a capacitor, to include multilayer ceramic capacitors (MLCCs), including terminations made incorporating the inventive termination inks as discussed hereinabove. Also envisioned within the practice of the present invention is a method of making multilayer ceramic chip capacitor having end terminations comprising: forming a green chip by stacking alternating layers of a dielectric material and a conductive electrode material, firing the green chip to form a multilayer ceramic chip capacitor, dipping the terminations of the capacitor in a conductive paste comprising copper and an ink including a glass component, post-firing the chip to sinter the end terminations. Any glass component disclosed herein may be used in the method of making a multilayer chip capacitor.

The configuration of multilayer ceramic capacitors is well known in the art. With reference to FIG. 1, an exemplary structure of a multilayer ceramic chip capacitor 1 is shown. Conductive end terminations 4 of the capacitor 1 are disposed on side surfaces of the capacitor chip or body 10 and in electrical connection with internal conductive electrode layers 3. The capacitor chip 10 has a plurality of alternately stacked dielectric layers 2. The shape of the capacitor chip 10 is not critical although it is often rectangular shaped. Also, the size is not critical and the chip may have appropriate dimensions in accordance with a particular application, typically in the range of 1.0 to 7.0 mm×0.5 to 5.0 mm×0.5 to 2.0 mm. The internal electrode layers 3 are stacked such that at opposite ends they are alternately exposed at opposite side surfaces of the chip 10. That is, the internal electrode layers 3 of one group are exposed at one side surface of the chip 10 and the internal electrode layers 3 of another group are exposed at the opposite side surface of the chip 10. One end termination 4 is applied to one side chip of the capacitor chip 10 in electrical contact with the internal electrode layers 3 of the one group, and the other end termination 4 is applied to the opposite side surface of the chip 10 in electrical contact with the internal electrode layers 3 of the other group. The dielectric layers are formed of one or more dielectric materials which may contain barium titanate ($BaTiO_3$) and other oxides such as neodymium titanate ($Nd_2Ti_2O_7$) and magnesium titanate ($MgTiO_3$) as major components, while manganese oxide, yttrium oxide, holmium oxide, calcium carbonate, silicon oxide, boron oxide, aluminum oxide, magnesium oxide, and calcium oxide may be present as minor components. Other compounds may be contained in the dielectric material provided that the other compound does not adversely affect dielectric properties.

Each dielectric layer preferably has a thickness of up to about 50 μm, more preferably up to about 20 μm. The lower limit of thickness is about 0.5 μm, preferably about 2 μm. The present invention is effectively applicable to multilayer ceramic chip capacitors having such thin dielectric layers for minimizing a change of their capacitance with time. The number of dielectric layers stacked is generally from about 2 to about 600, although embodiments having more than 600 layers are possible.

The conductor that forms the internal electrode layers 3 is not critical, although a base metal preferably is used since the dielectric material of the dielectric layers 2 has anti-reducing properties. Typical base metals are nickel and nickel alloys. The thickness of the internal electrode layers may be suitably determined in accordance with a particular purpose and application although its upper limit is typically about 5 μm, more preferably about 2.5 μm, and its lower limit is typically about 0.5 μm, more preferably about 1 μm.

An ink for forming the dielectric layers can be obtained by mixing a raw dielectric material with an organic vehicle. The raw dielectric material may be a mixture of oxides and composite oxides. The organic vehicle is a binder in an organic solvent. The binder used herein is not critical and may be suitably selected from conventional binders such as those disclosed hereinabove with reference to the inks of the present invention.

Referring to the Figure, terminations 4 are formed by applying the inventive termination ink across the ends of a prefired MLCC. The termination ink may be applied by dipping or brushing, as known in the art. The thickness of the termination may be suitably determined in accordance with a particular purpose and application although it generally ranges from about 1 μm to about 100 μm. Certain applications require the termination thickness to be about 10 μm to about 50 μm, or from about 20 μm to about 40 μm.

The multilayer ceramic chip capacitor of the present invention generally is fabricated by forming a green chip by conventional tape casting, printing and sheeting methods using slurries or pastes, firing the chip, and printing or transferring terminations thereto followed by a second firing. The termination inks are typically fired at temperatures lower than the initial firing to sinter the capacitor as a whole. The initial firing of the capacitor body generally occurs at a temperature of from about 650° to about 1200° C., and the firing of the body with the termination ink applied generally occurs at a temperature of from about 700° to about 900° C.

Further details on the manufacturing procedures used to make a MLCC may be found in U.S. Pat. No. 6,185,087 to Park et al. the disclosure of which is hereby incorporated by reference.

The following examples are intended only to illustrate the invention and should not be construed as imposing limitations upon the claims.

EXAMPLES

Glass frits J through N were each prepared using conventional glass melting techniques, and have the compositions in mole percent, as shown in Table 4. The glass transition temperature (Tg), coefficient of thermal expansion (CTE), and compositional ratios (mole $B_2O_3$/mole $SiO_2$) are found in Table 4.

Termination inks JJ through NN having the compositions as listed in Table 5 were prepared by standard ink preparation procedures. The inks have a viscosity of about 15,000 centipoise to about 35,000 centipoise. The copper powders used herein are commercially available from the Ferro Corporation. Copper powder Cu I has a $D_{50}$ particle size of about 0.8 micron, Copper powder Cu II has a $D_{50}$ particle size of about 4 to 6 microns, Copper powder Cu III has a $D_{50}$ particle size of about 2.5 to 3.5 micron, and Copper powder Cu IV is a flaked powder having a $D_{50}$ particle size of about 4 to 6 microns. $BaTiO_3$ capacitors of case size 1206 were terminated with these pastes and fired at different firing temperatures.

The optimum firing range (i.e., processing window) for each termination ink was determined based on achieving acceptable properties for copper densification, nickel engross depth, adhesion, and no glassing. After firing a capacitor, the end termination is plated with nickel. In order to find the amount of Ni engross the capacitor is mounted in a cross section and polished. The depth of nickel engross is measured and should not exceed 10% of the thickness of the end termination. Further, on a 1206 capacitor, the peel strength of the end termination must be greater than 1.5 pounds. With respect to glassing, no glass beads or blistering should appear. The optimum firing temperature is taken as that temperature which is 10° C. below the temperature at which glass beads or blisters (glassing defects) are evident. If glassing is evident at 820° C. and not 810° C., then 810° C. is the upper limit of the processing window. The lower limit of this window is that temperature which is 10° C. above the minimum temperature at which sufficient copper densification, as measured by cross sectional microscopy and adhesion, as measured by peel strength of at least 1.5 pounds, is achieved. Copper densification should be at least about 90% or above. The nickel engross should also be no greater than 10% at the lower temperature limit. The optimum firing temperatures thus obtained are listed in Table 5, which indicates a firing window of about 10° C. to about 30° C. for the inventive copper termination inks.

TABLE 4

Exemplary lead-free and cadmium-free glasses for copper termination inks: compositions and properties

| | frit composition | | | | |
|---|---|---|---|---|---|
| | J | K | L | M | N |
| Oxide | mole percent | | | | |
| ZnO | 30.1 | 12.3 | 15.7 | 18.3 | 20.9 |
| $B_2O_3$ | 24.1 | 11.9 | 16.5 | 17.6 | 18.7 |
| $SiO_2$ | 24.2 | 55.3 | 48.2 | 41.4 | 34.6 |
| $Al_2O_3$ | 2.1 | 1.6 | 1.1 | 1.3 | 1.5 |
| BaO | 12.9 | 0.8 | | | |
| $K_2O$ | | 1.7 | 0.3 | 0.8 | 0.8 |
| $Na_2O$ | | 9.3 | 6.8 | 7.3 | 8.4 |
| $Li_2O$ | | 7.1 | | | |
| $TiO_2$ | 3.6 | | 1.9 | 2.2 | 2.5 |
| $ZrO_2$ | 3.0 | | 1.5 | 1.8 | 2.1 |
| F | | | 8.0 | 9.3 | 10.6 |
| Total | 100 | 100 | 100 | 100 | 100 |
| $B_2O_3/SiO_2$ molar ratio | 1.00 | 0.22 | 0.34 | 0.43 | 0.54 |
| Glass transition, Tg, ° C. | 570 | 466 | 465 | 453 | 450 |
| TCE ($10^{-7}$/° C.) | 80.5 | 88 | 58.5 | 64.8 | 70 |

TABLE 5

Compositional Analysis of Inventive Inks and optimum firing range

| Ink | Glass used (Table 4) | Cu I | Cu II | Cu III | Cu IV | Glass | Acrylic resin | surfactants | Terpineol prime 318 | Optimum firing range, ° C. |
|---|---|---|---|---|---|---|---|---|---|---|
| | | | | | weight percent | | | | | |
| JJ | J | | 25.0 | | 45.9 | 7.0 | 5.1 | 0.8 | 16.2 | 810-830 |
| KK | K | 39.5 | | | 28.0 | 10.0 | 5.1 | 0.8 | 16.6 | 810-825 |
| LL | L | | 25.0 | 45.9 | | 7.0 | 5.1 | 0.8 | 16.2 | 830-850 |
| MM | M | | 25.0 | 45.9 | | 7.0 | 5.1 | 0.8 | 16.2 | 820-840 |
| NN | N | | 25.6 | 26.3 | 20.0 | 6.0 | 5.1 | 0.8 | 16.2 | 820-840 |

It will be appreciated that an ink made in accordance with the present invention may also be used to form conductive pathways on various electronic devices. Thus, use of the present ink is not intended to be limited to capacitor devices alone. The presently most preferred embodiment of the invention is glass N, (Table 4) which comprises 20.9 mol % ZnO, 18.7 mol % $B_2O_3$, 34.6 mol % $SiO_2$, 1.5 mol % $Al_2O_3$, 0.8 mol % $K_2O$, 8.4 mol % $Na_2O$, 2.5 mol % $TiO_2$, 2.1 mol % $ZrO_2$ and, 10.6 mol % F. The presently most preferred termination ink is Ink NN (Table 5), which includes Glass Composition N.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A capacitor comprising a copper termination, said copper termination made by firing a lead-free and cadmium-free ink including a glass component, said glass component comprising:
   a. ZnO, provided the amount does not exceed 65 mole %;
   b. $B_2O_3$, provided the amount does not exceed 61 mole %; and,
   c. $SiO_2$, provided the amount does not exceed 63 mole %;
   wherein the molar ratio of $B_2O_3$ to $SiO_2$ is from about 0.05 to about 3.

2. The capacitor of claim 1 wherein the glass component further comprises:
   a. $Al_2O_3$, provided the amount does not exceed 17 mole %; and
   b. BaO+CaO, provided the amount does not exceed 40 mole %;
   wherein the glass component excludes alkali oxides.

3. The capacitor of claim 2 further comprising at least one ingredient selected from the group consisting of 2-25 mol % $Li_2O+Na_2O+K_2O+Rb_2O+Cs_2O+Fr_2O$, and 0.1-15 mol % $TiO_2+ZrO_2$.

4. The capacitor of claim 1 wherein the molar ratio of $B_2O_3$ to $SiO_2$ is from about 0.05 to about 3 and wherein the glass component comprises:
   a. about 10 to about 60 mole % ZnO;
   b. about 1 to about 40 mole % $B_2O_3$;
   c. about 1 to about 55 mole % $SiO_2$; and further comprises
   d. about 0.1 to about 17 mole % $Al_2O_3$; and,
   e. BaO+CaO, provided the combined amount of BaO+CaO does not exceed about 30 mole %.

5. The capacitor of claim 4 further comprising at least one ingredient selected from the group consisting of:
   a. about 0.1 to about 20 mol % $Co_3O_4$;
   b. about 0.1 to about 20 mol % $MnO_2$; and,
   c. about 0.1 to about 20 mol % CuO.

6. The capacitor of claim 4 further comprising about 5 to about 18 mole % $Li_2O+Na_2O+K_2O+Rb_2O+Cs_2O+Fr_2O$.

7. The capacitor of claim 1 wherein the glass component comprises:
   a. about 25 to about 55 mole % ZnO;
   b. about 15 to about 25 mole % $B_2O_3$; and,
   c. about 10 to about 30 mole % $SiO_2$.

8. The capacitor of claim 7 wherein the glass component further comprises:
   a. about 1 to about 7 mole % $Al_2O_3$;
   b. about 5 to about 15 mole % BaO+CaO; and,
   c. wherein the glass component excludes alkali oxides.

9. The capacitor of claim 8, wherein the glass component further comprises at least one ingredient selected from the group consisting of
   a. about 5 to about 10 mole % $TiO_2+ZrO_2$;
   b. about 1 to about 10 mole % MgO; and,
   c. about 1 to about 20 mole % F.

10. The capacitor of claim 9 wherein the glass component further comprises about 5 to about 15 mole % $Li_2O+Na_2O+K_2O+Rb_2O+Cs_2O+Fr_2O$.

11. The capacitor of claim 1, wherein the glass component comprises:
    a. about 20 to about 30 mole % ZnO;
    b. about 15 to about 25 mole % $B_2O_3$; and
    c. about 35 to about 50 mole % $SiO_2$.

12. The capacitor of claim 11, wherein the glass component further comprises:
    a. about 0.1 to about 5 mole % $Al_2O_3$;
    b. about 1 to about 13 mole % $Li_2O+Na_2O+K_2O+Rb_2O+Cs_2O+Fr_2O$; and
    c. about 5 to about 15 mole % $TiO_2+ZrO_2$.

13. The capacitor of claim 12, wherein the glass component further comprises at least one ingredient selected from the group consisting of
    a. about 1 to about 20 mole % F, and
    b. about 0.1 to about 5 mole % of at least one ingredient selected from the group consisting of $In_2O_3$, SnO, CuO, NiO, and MnO.

14. The capacitor of claim 1, wherein the glass component comprises:
    a. about 15 to about 25 mole % ZnO;
    b. about 15 to about 20 mole % $B_2O_3$; and,
    c. about 33 to about 49 mole % $SiO_2$.

15. The capacitor of claim 14, wherein the glass component further comprises:
    a. about 0.1 to about 5 mole % $Al_2O_3$ and
    b. about 5 to about 10 mole % $Li_2O+Na_2O+K_2O+Rb_2O+Cs_2O+Fr_2O$.

16. The capacitor of claim 15, wherein the glass component further comprises:
    a. about 5 to about 15 mole % $TiO_2ZrO_2$ and
    b. about 1 to about 20 mole % F.

17. A capacitor comprising a copper termination, said copper termination made by firing a lead-free and cadmium-free ink including a glass component, said glass component comprising a first glass and a second glass frit, wherein the first frit comprises:
    a. about 5 to about 20 mole % $B_2O_3$ and about 70 to about 90 mole % $SiO_2$, and the second frit comprises
    b. about 25 to about 55 mole % ZnO, and about 15 to about 25 mole % $B_2O_3$, and about 10 to about 30 mole % $SiO_2$,
    wherein the weight ratio of the first frit to the second frit is from about 1:20 to about 20:1, and wherein the overall molar ratio of $B_2O_3$ to $SiO_2$ is from about 0.05 to about 1.

18. A lead-free and cadmium-free ink for forming a conductive copper pathway, said ink comprising a metal component and about 1 to about 22 percent by weight of glass component, said glass component comprising:
    a. ZnO, provided the amount does not exceed 65 mole %
    b. $B_2O_3$, provided the amount does not exceed 61 mole %;
    c. $SiO_2$, provided the amount does not exceed 63 mole %; and,
    d. wherein the molar ratio of $B_2O_3$ to $SiO_2$ is from about 0.05 to about 3.

19. The ink of claim 18, wherein the glass component further comprises at least one ingredient selected from the group consisting of:
   a. about 0.1 to about 20 mole % MgO;
   b. about 0.1 to about 40 mole % BaO+CaO; and,
   c. about 0.1 to about 17 mole % $Al_2O_3$.

20. A process for making a multilayer ceramic chip capacitor having conductive end terminations comprising:
   a. forming a green chip by stacking alternating layers of a dielectric material and a conductive electrode material,
   b. firing the green chip to form a multilayer ceramic chip capacitor body,
   c. applying a conductive lead-free and cadmium-free ink to the ceramic chip capacitor body, and said ink comprising a glass component, said glass component comprising:
      i. ZnO, provided the amount does not exceed 65 mole %;
      ii. $B_2O_3$, provided the amount does not exceed 61 mole %; and,
      iii. $SiO_2$, provided the amount does not exceed 63 mole %;
      iv. wherein the molar ratio of $B_2O_3$ to $SiO_2$ is from about 0.05 to about 3; and,
      v. post-firing the chip and forming the conductive end terminations.

* * * * *